United States Patent
Evers et al.

(10) Patent No.: US 7,422,787 B2
(45) Date of Patent: Sep. 9, 2008

(54) ORIENTED STRAND BOARDS

(75) Inventors: Lars Evers, Sittard (NL); Rodolphus Antonius Theodorus Maria Benthem, Van, Limbricht (NL); Jozef Maria Johannes Mattheij, Sittard (NL); Jose Guadalupe Gomez Bueso, Oslo (NO); Jacobus Adriaan Antonius Vermeulen, Geleen (NL)

(73) Assignees: DSM IP Assets B.V., Heerlen (NL); Dynea Oy, Helsinki (FI)

(*) Notice: Subject to any disclaimer, the term of this patent is extended or adjusted under 35 U.S.C. 154(b) by 354 days.

(21) Appl. No.: 10/561,942

(22) PCT Filed: Jun. 28, 2004

(86) PCT No.: PCT/NL2004/000456

§ 371 (c)(1),
(2), (4) Date: Dec. 22, 2005

(87) PCT Pub. No.: WO2005/000982

PCT Pub. Date: Jun. 6, 2005

(65) Prior Publication Data

US 2006/0157183 A1    Jul. 20, 2006

Related U.S. Application Data

(60) Provisional application No. 60/558,142, filed on Apr. 1, 2004.

(30) Foreign Application Priority Data

Jun. 30, 2003 (EP) .................... 03077077
Aug. 18, 2003 (EP) .................... 03102564

(51) Int. Cl.
*B32B 21/10* (2006.01)
(52) U.S. Cl. ............. 428/292.4; 428/297.1; 156/296; 264/113
(58) Field of Classification Search ........... 428/292.4, 428/297.1, 528, 511; 156/296; 264/113
See application file for complete search history.

(56) References Cited

U.S. PATENT DOCUMENTS

| 5,047,275 | A * | 9/1991 | Chiu ................ 428/106 |
| 6,379,814 | B1 * | 4/2002 | Dupre et al. ........... 428/528 |
| 6,399,719 | B1 | 6/2002 | Dopico et al. |
| 7,345,136 | B2 * | 3/2008 | Wescott et al. .......... 528/230 |
| 2002/0054994 | A1 | 5/2002 | Dupre et al. |
| 2006/0157183 | A1 * | 7/2006 | Evers et al. ............. 156/62.2 |

FOREIGN PATENT DOCUMENTS

DE        200 14 859       1/2001

* cited by examiner

*Primary Examiner*—N Edwards
(74) *Attorney, Agent, or Firm*—Nixon & Vanderhye P.C.

(57) ABSTRACT

Oriented strand board (OSB), comprising a core layer and two face layers, whereby the face layers comprise an adhesive composition, wherein the adhesive composition in at least one of the face layers comprises a resin composition comprising melamine, formaldehyde, optionally urea and aromatic hydroxyl compounds, wherein the molar ratio of melamine to formaldehyde is 1:0.8-4.0, the molar ratio of melamine to urea is 1:0-2.0 and the molar ratio of melamine to aromatic hydroxyl compounds is 1:0-2.0. In a preferred embodiment, both the face layers and the core layer comprise the said adhesive composition. The OSB's according to the invention can meet the OSB/3 and even the OSB/4 requirements in the EN 300 standards.

15 Claims, No Drawings

ORIENTED STRAND BOARDS

This application is the US national phase of international application PCT/NL2004/000456 filed 28 Jun. 2004 which designated the U.S. and claims benefit of EP 03077077.0, dated 30 Jun. 2003, EP 03102564.6, dated 18 Aug. 2003 and U.S. Pat. No. 60/558,142, dated 1 Apr. 2004, the entire content of which is hereby incorporated by reference.

The invention is directed to an Oriented Strand Board (OSB), comprising a core layer and two face layers, whereby at least the face layers comprise an adhesive composition.

The oriented strand boards that are commercially prepared at the moment comprise a core layer of wood strands combined with an adhesive composition, covered by two face layers of wood strands combined with an other adhesive composition. The strands in the OSB typically have the following dimensions; length between 5 and 150 mm, width between 1 and 50 mm and thickness between 0.1 and 2 mm. The core can form between 10 and 90 wt. % of the OSB, preferably between 40 and 70% of the OSB. The adhesive composition in core layer of the known OSB comprises 2-8 wt % (dry resin/dry wood) of a polymeric methylene diphenyl diisocyanate (pMDI) or a phenol formaldehyde (PF) resin. The adhesive composition in the face layers comprises a melamine-urea-formalydehyde (MUF) resin, and may also comprise a small amount of phenol or a phenol formaldehyde resin or pMDI resin with a release agent added thereto. The face layers have a resin content of typically 9-12 wt % dry resin/dry wood for MUF and typically 2-6 wt % dry resin/dry wood for PF. As is common practice, the adhesives in a prepared OSB are at least partially cured, preferably fully cured. These known OSB's can meet the requirements of OSB/3 or OSB/4 in the EN 300 standards.

It is a disadvantage of the known OSB's that a relatively high amount of resin is necessary, in particular in the face layers, in order to ensure that the OSB/3 or OSB/4 standards are met.

It is the objective of the present invention to overcome said disadvantage.

Said objective is achieved in that that the adhesive composition in at least one of the face layers comprises a resin composition comprising melamine, formaldehyde, optionally urea and optionally an aromatic hydroxyl compound, wherein the molar ratio of melamine to formaldehyde is 1:0.8-1:4.0, the molar ratio of melamine to urea is 1:0-1:2.0 and the molar ratio of melamine to aromatic hydroxyl compounds is 1:0-1:2.0. Preferably, the adhesive composition in both face layers comprises a resin according to the invention.

An advantage of the OSB according to the invention is that an OSB meeting the OSB/3 or OSB/4 standards can be made with a lower amount of resin in the face layers when the known type of resin for this application is used. By application of the resin as defined above for the preparation of at least one of the face layers of the OSB the amount of resin that has to be used for the face layer to make an OSB that meets the OSB/3 or OSB/4 standards can be reduced to as little as between 2.5-8 wt % dry resin/dry wood. As a result of this the cost price of the OSB will be lower than for a known OSB as described above. Alternatively, if the OSB according to the invention comprises the same amount of resin in at least one face layer, it will show superior properties compared to the known OSB, in particular relating to internal bond strength and swelling after contact with boiling water.

An OSB according to the invention means a prepared OSB; as is known, this means that any resins and/or adhesive compositions have been at least partially cured. Preferably, they have been cured fully.

The resin composition according to the invention comprises melamine and formaldehyde. The melamine and formaldehyde are present in the resin composition in a molar ratio of 1:0.8-1:4.0; preferably, the said molar melamine:formaldehyde ratio lies between 1:0.85 and 1:3.5, more preferably, the said ratio lies between 1:0.9 and 1:3.25; even more preferably, the said ratio lies between 1:1.0 and 1:3.0; in particular, the said ratio lies between 1:1.05 and 1:2.8; most preferably, the said ratio lies between 1:1.1 and 1:2.6. As is commonly known, resins are cured in order to achieve their final properties. The wording 'resin' in the present invention relates to the resin in both uncured condition as well as in partially or fully cured condition in the end product, when it is part of a prepared OSB.

The resin is normally made by mixing dry melamine powder with an aqueous solution of formaldehyde. This solution having a formaldehyde concentration of for instance 30-55 wt % of formaldehyde.

Further the resin composition can contain urea and/or aromatic hydroxyl compounds.

When urea is present in the resin composition the molar ratio of melamine to urea is 1:0-2.0; preferably, the said molar melamine:urea ratio lies between 1:0.05 and 1:1.8, more preferably between 1:0.1 and 1:1.6, in particular between 1:0.15 and 1:1.4 or between 1:0.25 and 1:1.2. It was found, surprisingly, that the presence of some urea in the resin composition according to the invention has a beneficial effect on the end properties of the OSB according to the invention, even though urea as such is generally regarded as leading to inferior properties in comparison to melamine. In a preferred embodiment, therefore, the molar melamine:urea ratio in the resin lies between 1:0.25 and 1:0.9. When an aromatic hydroxyl compound is present in the resin composition the molar ratio of melamine to aromatic hydroxyl compound is 1:0-2.0, preferably 1:0.05-1.0.

Examples of aromatic hydroxyl compounds are resorcinol, hydrochinon or bisphenol A. Preferably however phenol is used as the aromatic hydroxyl compound.

The urea can be introduced in the resin composition by adding solid urea or by adding a urea solution in water and mixing it with the melamine and the formaldehyde solution. Also an aqueous solution of formaldehyde and urea can be used in combination with the melamine powder.

Phenol can be added as such when the resin composition is prepared or as a formaldehyde/phenol precondensate.

In a preferred embodiment of the OSB according to the invention, at least one face layer does not comprise a polymeric methylene diphenyl diisocyanate (pMDI) resin; more preferably, neither of the face layers comprises a pMDI resin. In another preferred embodiment according to the invention, the core layer does not comprise a pMDI resin. Still more preferably, the OSB as a whole does not comprise a pMDI resin. This has the advantage that the OSB can be prepared more quickly, since aminoplast-containing adhesive compositions typically have a higher cure speed than pMDI-based adhesive compositions.

A non-limiting indication of the preparation of the resin that is used for preparing the OSB according to the invention is as follows: the components that make up the resin composition are added to each other and mixed at a temperature of 20 to 40° C. Thereafter the temperature is raised to a temperature between 70 and 100° C. The pH-value of the mixture is preferably between 7.0 and 10.0. Under these conditions the mixture reacts, i.e. condensation taking place, until the viscosity of the resin composition is between 10 and 1000 mPas, preferably between 200 and 900 mPas. Thereafter the resin composition is cooled to 20-75° C., preferably to room temperature. The pH of the cooled resin composition will typically be between 7 and 10.

Another non-limiting indication of a method for preparation of the resin composition that is part of the OSB according to the invention is a method that comprises stepwise dosing of the components. For example, urea can be added during or after the condensation.

To adjust the pH of the resin composition the normal additives to create alkaline conditions can be used, like alkali or earth alkalihydroxydes, preferably in the form of their aqueous solutions, tertiary amines, like for instance tributylamine or triethylamine, or tertiary alkanolamines, like for instance triethanolamine and methyldiethanolamine.

The viscosity of the aqueous resin composition is typically at 20° C. 10-900 mPas and has a solids content of between 50 and 80%.

The products can usually be stored for a couple of weeks at 20° C. As is known, small amounts of other additives can also be added to the resin.

The resin composition according to the invention has surprisingly good properties when applied as the resin in the face layers of oriented strand board (OSB). A process thereto is described below.

To be applied in a face layer, the resin is usually mixed with a catalyst or hardener, whereby an adhesive composition is formed. As a hardener for instance ammonium sulphate is commonly used, in an amount of up to 5 wt % dry hardener/dry resin. However, other hardeners can also be used; for instance ammonium chloride or ammonium nitrate. The adhesive composition according to the invention may optionally comprise one or more other resins. During the preparation of the adhesive composition also waxes can be applied; this is commonly done in order to enhance the moisture resistance of the OSB. In a preferred embodiment of the OSB according to the invention, the three molar ratios as given above for the resin as comprised within the adhesive composition (melamine to formaldehyde, melamine to urea and melamine to aromatic hydroxyl compound) also apply to the adhesive composition as a whole. Preferably, the adhesive composition does not comprise any other resins than the resin composition as indicated above.

After addition of the catalyst the adhesive composition is normally used within a time frame of a few hours in the production of an OSB; the adhesive composition is sprayed on the wood strands to coat the wood strands with it. The wood strands usually have a length between 5 and 200 mm, preferably between 20 and 150 mm, more preferably between 40 and 140 mm, in particular between 60 and 130 mm and most preferably between 80 and 120 mm. The wood strands usually have a width between 1 and 60 mm, preferably between 5 and 50 mm, more preferably between 10 and 40 mm, in particular between 14 and 30 mm and most preferably between 18 and 25 mm. The wood strands usually have a thickness lying between 0.1 and 2 mm, preferably between 0.2 and 1.5 mm, more preferably between 0.3 and 1.2 mm, in particular between 0.4 mm and 1 mm, most preferably between 0.5 and 0.8 mm. The adhesive composition is cured/hardened upon heating, thereby binding the wood strands to each other. Heating and curing/hardening takes place when pressing the final OSB material.

The process for the production of an OSB is known in general, and described in for instance: "Holzwerkstoffe und Leime, M. Dunky and P. Niemz, p 133-135, Springer-Verlag, 2002" and in "Taschenbuch der Spanplatten Technik, Deppe & Ernst, p 258-266, 1991, DRW Verlag".

A method of making the oriented strand boards according to the invention comprises spraying the adhesive composition according to the invention onto the wood strands for at least one of the face layers of the OSB, preferably in both face layers. In order to achieve a quality according to the OSB/3 or OSB/4 standard, the amount of resin in the said face layer or layers can be 2.5 to 8 wt % dry resin/dry wood. Preferably, the amount of resin in the face layer or layers is at least 2.75%, more preferably at least 3.0%; this has the advantage that with increasing amount of resin, the properties of the OSB also increase; in particular, the amount of resin in the face layer or layers is at least 3.25%, most preferably at least 3.5 wt. % dry resin/dry wood. In order to ensure that the OSB according to the invention remains cost competitive, it is preferred that the amount of resin in the face layer or layers is at most 7.5%, more preferably at most 7.0%, in particular at most 6.5% and most preferable at most 6 wt. % dry resin/dry wood The core material is prepared by coating wood strands. Usually, the wood strands in the core layer are smaller than the wood strands in the face layers. In the known OSB's, the coating (also referred to as treating) of the wood strands is typically done with adhesive compositions essentially consisting of polymeric methylene diphenyl diisocyanate (pMDI) or phenol formaldehyde (PF) resins. In the OSB according to the invention, this may also be done. In a preferred embodiment of the OSB according to the invention, however, the wood strands of the core layer comprise an adhesive composition comprising a resin composition comprising mainly—or even consisting essentially of—melamine, formaldehyde, optionally urea and optionally an aromatic hydroxyl compound. The resin in the adhesive composition in the core layer preferably has a molar ratio of melamine to formaldehyde of 1:0.8-1:9, a molar ratio of melamine to urea of 1:0-1:6, and a molar ratio of melamine to aromatic hydroxyl compound of 1:0-1:2. More preferably, the resin in the adhesive composition in the core layer has a molar ratio of melamine to formaldehyde of 1:0.8-1:4 and a molar ratio of melamine to urea of 1:0.1-1:1.5. This has the advantage that, as in the face layers, a lower amount of adhesive composition may be used in the core layer compared to the known adhesive compositions based on pMDI or pure PF resins while still achieving the desired end properties such as the properties as required in the OSB/3 or OSB/4 standard. In this embodiment, the OSB according to the invention preferably does not comprise any pMDI (uncured, partically cured or fully cured). Preferably, the molar ratios as given also apply to the adhesive composition as a whole, whereby the adhesive composition preferably does not comprise any other resins.

The resin composition as used in the adhesive composition according to the invention has a solids content. As is known to the skilled person, the solids content of a resin is determined by putting a small amount of resin (e.g., 1 or 2 grams) in an oven at 120° C. during 2 hours. The solids content is defined as the relative weight of the remaining material, and is expressed as percentage of the weight of the resin as put in the oven. In a preferred embodiment of the process according to the invention, the resin composition as used in treating the wood strands of the core layer has a solids content of at least 60% or 62%. More preferably, the solids content is at least 64% or 66%. As the solids content rises, the amount of water that is introduced into the core layer is reduced. Since this water should be removed during the subsequent pressing step, it is beneficial that as little water as possible is introduced. In particular, therefore, the solids content of the resin is at least 68%. Most preferably, the solids content is at least 70%. As the solids content rises, so does the viscosity of the resin. Practice has shown that it is beneficial for achieving a smooth distribution of the adhesive composition over the wood strands if the solids content of the resin remains below 80%, more preferably below 78%, in particular below 76% and most preferably below 75%. Preferably, the viscosity of the adhesive composition lies between 700 and 900 mPa·s; as indicated earlier, the viscosity of the adhesive composition is also influenced by the degree of condensation that has taken place.

The use of a resin composition comprising melamine, formaldehyde, optionally urea and optionally an aromatic hydroxyl compound in adhesive composition of the core layer of an OSB is—aside from considerations relating to the face layers—beneficial in itself. The invention therefore also relates to an OSB, comprising a core layer and two face layers, whereby at least the core layer comprises an adhesive composition, wherein the adhesive composition in the core layer comprises a resin composition comprising melamine, formaldehyde, optionally urea and optionally an aromatic hydroxyl compound, wherein the molar ratio of melamine to formaldehyde is 1:0.8-1:9, the molar ratio of melamine to urea is 1:0-1:6, and the molar ratio of melamine to aromatic hydroxyl compound is 1:0-1:2. Preferably, the resin in the adhesive composition of the core layer has a molar ratio of melamine to formaldehyde of 1:0.8-1:4 and a molar ratio of melamine to urea of 1:0.1-1:2. The amount of resin in the core layer is in this aspect of the invention as given above. Preferably, therefore, the amount of urea in the core layer is 0-0.025 kg/kg core layer, more preferably 0.005-0.015 kg of urea per kg core layer. The solids content of the resin used for the core layer is preferably within the limits as given above.

The face layers of this OSB according to the invention may comprise the known adhesive compositions, i.e. comprising a pMDI-based resin or a PF resin. Preferably, however, at least one face layer—and preferably both face layers—comprise adhesive compositions whereby the resins comprise—or even consist essentially of—the compounds as described above according to the invention. Preferably, the same adhesive composition is used for both the face layers as well as for the core layer. This has the advantage that only one type of resin and adhesive composition has to be handled for the preparation of the OSB.

An OSB is typically prepared by first scattering—while usually achieving an orientation—the face layer material, thereafter the core layer material and then again a layer of face layer material, followed by hot pressing this to an OSB. During the hot pressing curing takes place. The pressing can be continuous or batch wise. In the core layer and the face layers wood strands of different size and orientation can be used. Typically, the wood strands in the core layer have smaller dimension(s) and less orientation than the wood strands in the face layers.

As described here, an OSB has three layers—a core and two face layers. It is also known that an OSB having 4 or more layers may be prepared, for instance by introducing at least one layer between the core and at least one face layer. Preferably within the context of the present invention, all layers that are not face layers are regarded—and treated according the invention—as core layer.

Typical known press conditions are 1-7 MPa, 150-270° C. during 3-12 sec/mm, preferably 5-10 sec/mm. As is known to those skilled in the art, press times are given in seconds per mm of OBS thickness.

In summary, a process for the preparation of an oriented strand board (OSB) according to the invention preferably comprises the following steps:

a) preparing an adhesive composition comprising a resin composition comprising melamine, formaldehyde, optionally urea and aromatic hydroxyl compounds, wherein the molar ratio of melamine to formaldehyde is 1:0.8-4.0, the molar ratio of melamine to urea is 1:0-2.0 and the molar ratio of melamine to aromatic hydroxyl compounds is 1:0-2.0;
b) treating wood strands with the adhesive composition;
c) scattering adhesive-treated wood strands for a face layer, a core layer on top of the face layer, and again a face layer on top of the core layer, whereby the wood strands of at least one face layer were treated with the adhesive composition prepared in a);
d) pressing the wood strands, whereby the adhesive composition is at least partially cured, to form an OSB.

Preferably, the wood strands of both of the face layers are treated with an adhesive composition as prepared in step a). Preferably, the resin in the adhesive composition as prepared in step a) has a solids content lying between 67% and 77%, more preferably between 70% and 75%. Preferably, the core layer is also treated with an adhesive composition as prepared in step a).

The OSB's according to the invention may comprise an amount of urea—typically for the most part in bonded form—in at least of face layer. This amount can be expressed as the number of kilograms of urea per kg of face layer. Preferably, at least one face layer of the finished OSB according to the invention comprises an amount of urea of 0.001-0.025 kg/kg face layer, more preferably 0.005-0.015 kg/kg face layer. The amount of urea in the face layer can be determined with known methods such as for instance Raman spectroscopy or solid state NMR. The reference to urea in an OSB face layer within the context of the present invention means urea as such and in bonded form in a resin. Preferably, the urea content of the core layer is also within the range as given above.

The finished OSB according to the invention can meet the requirements for an OSB/3 or OSB/4 material as are laid down in the EN 300 requirements. Typical requirements herein are the requirements for thickness swelling and internal bond after boiling.

The thickness swelling is determined according to EN 317 and must be lower than 15 or 12% for an OSB meeting the OSB/3 or OSB/4 standard, respectively. The internal bond after boiling is determined according to EN 321 and EN 319. The minimum values differ with the OSB thickness and are:

|  | Internal bond (N/mm$^2$) | |
| --- | --- | --- |
| OSB thickness (mm) | OSB/3 | OSB/4 |
| 6–<10 | >0.15 | >0.17 |
| 10–<18 | >0.13 | >0.15 |
| 18–<25 | >0.12 | >0.13 |

The invention is elucidated further by means of the following examples.

EXAMPLE I

Resin Preparation

A solution of a 50 wt. % solution of formaldehyde in water and a phenol formaldehyde precondensate were added to each other and stirred. The mixture was adjusted with NaOH to a pH of 9. Melamine was added at room temperature. Thereafter the temperature was raised to 90° C. Dissolution of the melamine and condensation takes place until the water tolerance was 1.5-2. The water tolerance was determined at 20° C.

Thereafter the mixture was cooled. At 60° C. the urea was added and thereafter the mixture was cooled further to room temperature during stirring.

The resin composition contained per mol of melamine: 2.2 mol formaldehyde; 0.26 mol urea and 0.16 mol phenol.

The resin properties were:
Viscosity 300 mPas (at 20° C.),
pH=10,
Solid content=62.5%,
Gel time=50 sec.,
Water tolerance=1.5

OSB Preparation

The adhesive composition for the two face layers of the OSB was made by adding ammonium sulphate as hardener to the resin, and 1 wt. % (based on the 'wet' resin) of a wax emulsion. Then the adhesive composition was sprayed onto the wood strands.

The face layer for the OSB contained 5.8% dry resin/dry wood and 1% dry hardener/dry resin.

The adhesive composition for the core layer was also sprayed on the wood strands. The core layer for the OSB contained 3.0% dry pMDI/dry wood. Thereafter an OSB was made by scattering a layer of the wood strands for the face layer, than scattering a layer of wood strands for the core layer and thereafter again scattering a layer of wood strands for the second face layer.

The weight ratio core layer to face layers was 50/50. The OSB was pressed with a press factor of 9.4 sec/mm, an average temperature of 235° C. and a pressure of 5 MPa.

An OSB was made with a thickness of 22 mm having a thickness swell of 8.9% and an internal bond value after boiling of 0.155 N/mm$^2$.

EXAMPLE II

With the same method as described for example I an OSB was made with a thickness of 18 mm. For this OSB the face layer contained 6.0% dry resin/dry wood and 1.5% dry hardener/dry resin.

The OSB was pressed with a press factor of 9.2 sec/mm, an average temperature of 235° C. and a pressure of 5 MPa.

An OSB was made with a thickness swell of 11.0% and an internal bond value after boiling of 0.15 N/mm$^2$.

COMPARATIVE EXPERIMENT

Resin Preparation

A solution of a 50 wt. % solution of formaldehyde in water and a phenol formaldehyde precondensate were added to each other and stirred. The mixture was adjusted with NaOH to a pH of 9. Melamine was added at room temperature.

Thereafter the temperature was raised to 90 ° C. During this phase, when the temperature had reached 82° C., urea was added. Dissolution of the melamine (and urea), and condensation took place until the water tolerance was 3. The water tolerance was determined at 20° C. During condensation, the pH was kept at 9 by addition of NaOH; when water tolerance of 3 was reached, the pH was raised to 10. Thereafter the mixture was cooled to room temperature.

The resin composition contained per mol of melamine: 4.17 mol formaldehyde; 2.27 mol urea and 0.2 mol phenol.

The resin properties were:
Viscosity 300 mPas (at 20° C.),
pH=10,
Solid content=62.5%,
Gel time=50 sec.,
Water tolerance=3

OSB Preparation

The adhesive composition for the two face layers of the OSB was made by adding ammonium sulphate as hardener to the resin, and 1 wt. % (based on the 'wet' resin) of a wax emulsion. Then the adhesive composition was sprayed onto the wood strands.

The face layer for the OSB contained 11 wt. % dry resin/dry wood and 1% dry hardener/dry resin.

The adhesive composition for the core layer was also sprayed on the wood strands. The core layer for the OSB contained 3.0% dry pMDI/dry wood. Thereafter an OSB was made by scattering a layer of the wood strands for the face layer, than scattering a layer of wood strands for the core layer and thereafter again scattering a layer of wood strands for the second face layer.

The weight ratio core layer to face layers was 50/50. The OSB was pressed with a press factor of 9.4 sec/mm, an average temperature of 235° C. and a pressure of 5 MPa.

An OSB was made with a thickness of 22 mm having a thickness swell of 10% and an internal bond value after boiling of 0.14 N/mm$^2$.

EXAMPLE III

Preparation of Resin A—Resin for Face Layer

The same resin as prepared in Example I was used.

Preparation of Resin B—Resin for Core Layer

A solution of a 50 wt. % solution of formaldehyde in water and a phenol formaldehyde precondensate were added to each other and stirred. The mixture was adjusted with NaOH to a pH of 9. Melamine was added at room temperature.

Thereafter the temperature was raised to 90° C. During this phase, when the temperature had reached 82° C., urea was added. Dissolution of the melamine (and urea), and condensation took place until the water tolerance was 3. The water tolerance was determined at 20° C. During condensation, the pH was kept at 9 by addition of NaOH; when water tolerance of 3 was reached, the pH was raised to 10. Thereafter the mixture was cooled to room temperature.

The resin composition contained per mol of melamine: 2.6 mol formaldehyde; 0.9 mol urea and 0.16 mol phenol. The resin properties were:
Viscosity 300 mPas (at 20° C.),
pH=9.6,
Solid content=62%,
Gel time=55 sec.,
Water tolerance=1

OSB Preparation

The adhesive composition for the two face layers of the OSB was made by adding ammonium sulphate as hardener to resin A, and wt. % (based on the 'wet' resin) of a wax emulsion. Then the adhesive composition was sprayed onto the wood strands.

The face layer for the OSB contained 5.8% dry resin/dry wood and 1% dry hardener/dry resin.

The adhesive composition for the core layer of the OSB was made by adding ammonium nitrate as hardener to resin B, and 1 wt. % (based on the 'wet' resin) of a wax emulsion. Then the adhesive composition was sprayed onto the wood strands.

The core layer of the OSB contained 4% dry resin/dry wood and 2% dry hardener/dry resin.

Thereafter an OSB was made by scattering a layer of the wood strands for the face layer, than scattering a layer of wood strands for the core layer and thereafter again scattering a layer of wood strands for the second face layer.

The weight ratio core layer to face layers was 50/50. The OSB was pressed with a press factor of 8 sec/mm, an average temperature of 200° C. and a pressure of 5 MPa.

An OSB was made with a thickness of 16 mm having an internal bond value after boiling of 0.13 N/mm$^2$.

EXAMPLE IV

Preparation of Resin A—Resin for Face Layer

The same resin A as prepared in Example III was used.

Preparation of Resin B—Resin for Core Layer

The same resin B as prepared in Example III was used.

OSB Preparation

The adhesive compositions and the 16 mm OSB were prepared in the same fashion as in example III, except that the core layer contained 5% dry resin/dry wood. The internal bond value after boiling of the OSB was 0.25 N/mm$^2$.

Additional Data

The OSB's as prepared in Example II and Example IV were stripped completely of their face layers. Subsequently, the internal bond value after boiling of the core layers as such was measured. Both core layers had a value of 0.25 N/mm$^2$.

As is evident from Example I and the comparative experiment, the OSB according to the invention has a much lower amount of aminoplast resin in the face layers than the OSB prepared with an aminoplast resin known for this purpose, and yet the properties of OSB according to the invention are at least as good as those of the known OSB. Examples II, III and IV demonstrate that also thinner OSB's can be made according to the invention, showing satisfactory properties—also when both the face layers and the core layer comprise an adhesive prepared according to the invention from an aminoplast resin. The additional data, moreover, shows that it is beneficial when the adhesive composition in both the face layers and the core layer comprises or even consists essentially of an adhesive prepared according to the invention from an aminoplast resin, since this results in an OSB having a higher internal bond value.

The invention claimed is:

1. Oriented strand board (OSB), comprising a core layer and two face layers, whereby at least the face layers comprise an adhesive composition, wherein the adhesive composition in at least one of the face layers comprises a resin composition comprising melamine, formaldehyde, optionally urea and optionally an aromatic hydroxyl compound, and wherein the molar ratio of melamine to formaldehyde is 1:0.8-1:4.0, the molar ratio of melamine to urea is 1:0-1:2.0 and the molar ratio of melamine to aromatic hydroxyl compound is 1:0-1:2.0.

2. Oriented strand board according to claim 1, wherein the resin composition has a molar ratio of melamine to formaldehyde of 1:1-1:3.0, a molar ratio of melamine to urea of 1:0.05-1:1.5 and a molar ratio of melamine to aromatic hydroxyl compound of 1:0-1:1.0.

3. Oriented strand board according to claim 1, wherein the aromatic hydroxyl compound comprises phenol.

4. OSB according to claim 1, wherein the core layer comprises an adhesive composition, whereby the adhesive composition in the core layer comprises a resin composition comprising melamine, formaldehyde, optionally urea and optionally an aromatic hydroxyl compound.

5. OSB according to claim 4, wherein the resin in the adhesive composition in the core layer has a molar ratio of melamine to formaldehyde of 1:0.8-1:9, a molar ratio of melamine to urea of 1:0-1:6, and a molar ratio of melamine to aromatic hydroxyl compound of 1:0-1:2.

6. OSB according to claim 5, wherein the resin in the adhesive composition in the core layer has a molar ratio of melamine to formaldehyde of 1:0.8-1:4 and a molar ratio of melamine to urea of 1:0-1:2.

7. Oriented strand board according to claim 1, wherein the resin in the adhesive composition of the core layer is the same as the resin in the adhesive composition of at least one of the face layers.

8. Oriented strand board according to claim 1, wherein the amount of resin in the at least one face layer is 2.5-8 wt % dry resin/dry wood.

9. Oriented strand board according to claim 4, wherein the amount of resin in the core layer is 2.5-8 wt % dry resin/dry wood.

10. Oriented strand board according to claim 1, wherein the amount of urea in a face layer is 0-0.025 kg/kg face layer.

11. Oriented strand board according to claim 10, wherein the amount of urea in a face layer is 0.005-0.015 kg/kg face layer.

12. Process for the preparation of an oriented strand board (OSB), comprising the steps of:
   a) preparing an adhesive composition comprising a resin composition comprising melamine, formaldehyde, optionally urea and optionally an aromatic hydroxyl compound, wherein the molar ratio of melamine to formaldehyde is 1:0.8-1:4.0, the molar ratio of melamine to urea is 1:0-1:2.0 and the molar ratio of melamine to aromatic hydroxyl compound is 1:0-1:2.0;
   b) treating wood strands with the adhesive composition;
   c) scattering adhesive-treated wood strands for a face layer, a core layer on top of the face layer, and again a face layer on top of the core layer, whereby the wood strands of at least one face layer were treated with the adhesive composition prepared in a);
   d) pressing the wood strands, whereby the adhesive composition is at least partially cured, to form an OSB.

13. Process for the preparation of an OSB according to claim 12, wherein the wood strands of the face layers and of the core layer were treated with an adhesive composition as prepared in step a).

14. Process according to claim 12, wherein the resin composition as used in step a) has a solids content of 65-75%.

15. Oriented strand board (OSB) which is made by the process of claim 14.

* * * * *